United States Patent [19]

Gruenberg

[11] 4,337,376

[45] Jun. 29, 1982

[54] COMMUNICATIONS SYSTEM AND NETWORK

[75] Inventor: Elliot L. Gruenberg, West New York, N.J.

[73] Assignee: Broadcom, Incorporated, West New York, N.J.

[21] Appl. No.: 108,552

[22] Filed: Dec. 31, 1979

[51] Int. Cl.³ .................... H04M 11/00; H04B 7/14; H04B 7/20; H04B 17/00

[52] U.S. Cl. .................... 179/2 EB; 455/17; 455/20; 455/56; 455/62; 343/100 TD

[58] Field of Search ................. 179/2 EB; 455/17, 20, 455/54, 56, 62; 343/100 TD

[56] References Cited

U.S. PATENT DOCUMENTS

| | | | |
|---|---|---|---|
| 2,467,299 | 4/1949 | Espenshied | 250/6 |
| 3,175,216 | 3/1965 | Enloe | 343/100 |
| 3,243,507 | 3/1966 | Macovski | 358/260 |
| 3,300,782 | 1/1967 | Margerum et al. | 343/100 TD |
| 3,470,325 | 9/1969 | Frohbach et al. | 179/15.55 R |
| 3,474,191 | 10/1969 | Frohbach et al. | 358/260 |
| 3,492,432 | 1/1970 | Schimpf | 370/114 |
| 3,559,067 | 1/1971 | Genest et al. | 375/17 |
| 3,631,494 | 12/1971 | Gans et al. | 343/100 TD |
| 3,632,891 | 1/1972 | Basini et al. | 179/41 A |
| 3,696,421 | 10/1972 | Bitler | 343/100 TD |
| 3,757,335 | 9/1973 | Gruenberg | 343/100 TD |
| 3,772,596 | 11/1973 | Edwards | 375/3 |
| 3,936,611 | 2/1976 | Poole | 179/15.55 T |
| 4,001,691 | 1/1977 | Gruenberg | 455/17 X |
| 4,031,330 | 6/1977 | van Leeuwen | 179/2 EB |
| 4,074,047 | 2/1978 | Boutmy et al. | 370/118 |
| 4,107,609 | 8/1978 | Gruenberg | 325/14 |

Primary Examiner—Aristotelis M. Psitos
Attorney, Agent, or Firm—Amster, Rothstein & Engelberg

[57] ABSTRACT

A communications system and network wherein communications links between subscribers are established by retrodirective oscillating loops between each subscriber and a node station. Provision is also made for establishment of links between nodes so that remotely located subscribers can communicate. Information is transmitted between subscribers by using a mixing process in the node whereby information transmitted from one subscriber to the node is transferred at the node to a carrier signal transmitted between the node and another subscriber.

16 Claims, 11 Drawing Figures

COMMUNICATIONS SYSTEM AND NETWORK

DESCRIPTION OF THE INVENTION

The invention relates to a communications and control system and network and in particular to a system and network that provides flexible communications and control between stations regardless of their spatial location or relative motion.

Present communications and control systems are used to transmit and receive voice conversation, business and computer data, radio and television programming and graphic material. In such systems, information may be exchanged by a central station and one or more subscribers or individual subscribers may exchange information with each other. Ideally, the communications and control system should be operative without regard to the particular spatial location of a subscriber at any particular time and should be operative to provide the means for exchanging information between subscribers who are either at fixed locations or who are moving spatially with respect to one another. Heretofore, fixed communications and control systems have been provided by the switched public network and by private or leased-line systems. In present mobile communications and control systems, subscribers utilize omnidirectional broadcasts to make contact with a base station that relays all communications between subscribers via omnidirectional broadcasting means.

These prior systems suffer from a number of serious drawbacks For subscribers on a fixed system, the cost of central station switching equipment required to interconnect and direct calls and information is very high. Furthermore, the fixed systems rely on interconnecting subscribers via wire or cable, which means are also presently bandwidth limiting as well as quite expensive in material and labor cost. Present mobile communications systems utilize omnidirectional ratio broadcasting for base, relay and mobile stations thereby utilizing many frequencies over a general area. This omnidirectional broadcasting characteristic of present mobile systems communications and relay stations drastically reduces the possible number of simultaneous users because each user requires one operating frequency for the area. One approach to increasing the possible number of simultaneous users in an area is to segment the area into cells with each mobile and relay station allowed lower power limited range omnidirectional broadcasts. This approach, however, increases the cost and complexity of the mobile system and users must be switched as they move from cell to cell. Future increases in user demand require that the cells be made smaller and each station's transmitter reduced in power output.

These, and other problems are overcome by the present invention which provides a communications and control system and network that is divided into a fixed grid for the service area. When a user seeks a communication link with another user in the network, the system provides the means that allow a communications linkage to develop via radio frequency between the calling and called station or stations through one or more nodes without the necessity of intermediate switching equipment and without regard to their spatial location or relative motion. The highly directional character of the individual links that form this communications and control linkage between communicating stations allows many other users in the same area to utilize the same frequency simultaneously without interference and to operate efficiently with greatly reduced power over that necessary for present mobile systems. Future increases in simultaneous user demand will be far better accomodated by this "space-linking" system and such capacity increases as are required can be met simply by upgrading the capacity of the network's relay stations or nodes.

The linkage between subscribers is established by the buildup of directional communications and control links known as retrodirective oscillating loops such as are described in U.S. Pat. No. 3,757,335, issued Sept. 4, 1973 to Elliot L. Gruenberg, the disclosure of which is expressly incorporated herein by reference. Briefly, U.S. Pat. No. 3,757,335 describes a retrodirective oscillating loop or link for a communication and control channel between a pair of remotely located antenna terminals. In accordance with the disclosure, a carrier signal for the retrodirective oscillating loop builds up between two remotely controlled antenna array terminals each of which has retrodirective properties when sufficient amplification is provided in the loop to overcome losses which occur at the terminals and in the medium between the loops. The retrodirective oscillating loop antenna beams automatically steer toward each other when each terminal is effectively within the field of view of the other and when the retrodirective antenna develops sufficient gain as each of its multiple radiating antenna elements transmits the carrier wave form in proper phase relationship to one another, which will automatically result when the loop gain is greater than unity.

In accordance with the present invention, a series of links are set up between retrodirective relay stations or nodes such that several directional links can be established. An important feature of the invention is that the system does not require computation or knowledge of the location of the desired parties in order for a communications linkage to be established between subscribers. Another important feature of the invention is that switching equipment is not required on the nodes to establish or maintain the communications linkage between subscribers.

While some present day communication systems do not require switching equipment to establish communications between subscribers, these systems do require a large number of connections to insure that all subscribers can have access to all other subscribers in the system. One system which does not utilize switching equipment to establish connections between subscribers is described in U.S. Pat. No. 4,001,691 issued Jan. 4, 1977 to Elliot L. Gruenberg. While this system would provide good communications capability, it requires $$\frac{n(n-1)}{2}$$

connections, where n is the number of subscribers in the system.

In accordance with the system of the present invention, the complexity and cost of providing multiple paths for subscriber connections is substantially reduced since only a maximum of n/2 connections are required. In the present system, a connecting path is established by the calling party through a transponder at a central station, which will be referred to as a node, to the called party. Only one path is required between the calling party and the node and only one path between the node and the called party. Since the same path is used by both the called party and the calling party there will be no more than n/2 paths in use at any one time. There are, however, n channel designations, one for each party of the system who may at one time be a called party and at other times be a calling party.

Embodiments of the invention may be made utilizing any microwave or millimeter frequency allocation and may be satellite transponders. However, other frequencies may be used in some instances. Thus, channels may be of any desired or authorized bandwidth, for example, up to that which may accomodate high quality data or video information or combinations of video, data and voice. Elimination of intermediate switching greatly enhances the convenience and simplicity of the present system and eliminates potentially poor transmission paths.

While conventional directional microwave might be used for fixed communications, it cannot be used for mobile communications. The present system provides the flexibility to be used in fixed, mobile or combined fixed and mobile communications systems with increased transmission quality and greatly reduced cost due to the elimination of complex multiplex and switching equipment. The flexible directional aspects of the inventive systems increase the capacity of communications systems in local areas by permitting different streams of data in different directions to utilize the same frequencies without interference. The flexibility of the system thus permits more users to use the same frequency channel allocations with lower power requirements.

In general, the communications system of the present invention connects users of the system by one or more two-way links or loops, through intermediary transponders or nodes. A control carrier having a characteristic control carrier frequency is assigned to each system user. The control carrier is a signal which does not contain intelligence or information (modulation) but which establishes the linkage between subscribers, enables modulation to be detected and which is used to direct the intelligence in specific directions and hence along specific paths. To use the system, the calling party selects a control carrier frequency which is complementary to the control carrier frequency of the called party. Selection of this control carrier frequency automatically enables a transmission path between the calling party and the called party. For a local node call, a retrodirective oscillating loop is established between the calling party and a local node (which functions as relaying station) and a second retrodirective loop is established between the local node and the called subscriber. For long distance communications, the calling party's local node is connected through intermediate nodes to the local node associated with the called party and a retrodirective loop between the called party's local node and the called party completes the communications link between the parties. In another embodiment of the invention, the station coupled to the called party's local node may be the terminus of another communication system, such as a public switched network, which is then used to complete the connection to the called party.

Considering the operation of the system in more detail, the calling party's terminal is equipped with a receiving antenna array, a transmitting antenna array, each array including the same number of antenna elements, an amplifier, and a band pass filter coupled between each element of the transmitter and receiver antenna array which generate a control carrier having a preselected frequency. In practice a single array may be used by duplexing the receive and transmit connection to the same antenna element as is well known in the art. An oscillator in the terminal provides signals which serve as an offset between the receive and transmit signals and make possible the development of a retrodirective oscillating loop between the calling party's terminal and the calling party's local node, as is more fully described in U.S. Pat. No. 3,737,335.

The local node in accordance with the invention is equipped with a retrodirective array transceiver including receiving and transmitting antenna arrays. In each of the paths connecting the receiving antenna elements, and the transmitting antenna elements of the respective antenna arrays, there is a mixer and a band pass filter which is inserted into the path in advance of the amplifier required to establish the retrodirective oscillation. The filter is chosen to pass only a reference signal centered at frequency $2c$, where $c$ is the frequency of the calling party's control carrier. The mixer provides this reference signal when it receives two complementary signals, the frequency of which are, for example, $c+a$ and $c-a$. Thus, if the calling party provides a signal at one of these frequencies and the called party is set up to provide automatically a signal at the other frequency to input of the local node, two simultaneous retrodirective oscillating loops will develop, one between the calling party and the local node, with the calling party supplying a signal to the node at frequency $c+a$ and the other between the called party and the node with the called party supplying a signal to the node at frequency $c-a$. In the node, the two signals are multiplied by the mixer to provide a reference signal at frequency $2c$ or a suitably translated frequency which is retransmitted back from the node to both the calling and called parties. Each subscriber is equipped to receive the reference signal and the loop is completed. Once the appropriate filter and local oscillator frequencies have been selected, it is only necessary to provide sufficient electronic and antenna gain to set up the loop gain conditions for retrodirective oscillations. Thus, as long as the node, retrodirective antenna and amplifiers at each terminal can support greater than unity loop gain, two retrodirective loops transmitting control carriers will develop, one between the calling party and the local node and one between the called party and the local node. The node provides a directional path to and from each party, i.e. the node retrodirective antenna will receive and transmit the control carrier signals in only the two general directions of the called and calling party's terminals. Similarly, the antenna of the called and calling party will receive and transmit in the direction of the local node irrespective of whether the parties are fixed or moving relative to one another. Once the retrodirective loops are established to interconnect the parties, information of any type can be exchanged between the parties.

Information originated at a calling subscriber station is transmitted in the form of ratio frequency modulated signals to a node along with a carrier signal. From these signals which arrive in a fixed spatial phase relationship with respect to each other an information bearing signal is produced at the node which does not have any spatial phase relationship. This signal is transferred to the carrier signal of the called subscriber station by a mixing process. In this way the resultant signal contains the information bearing modulation of the calling station and the spatial phases of the called station. The node processes these phase relationships so that this composite signal will be transmitted by the node in the direction of the called station.

These and other objects and features of the invention will be more fully understood by considering the following detailed description of the presently preferred embodiments of the invention when taken in conjunction with the following drawings wherein.

Figure 1:
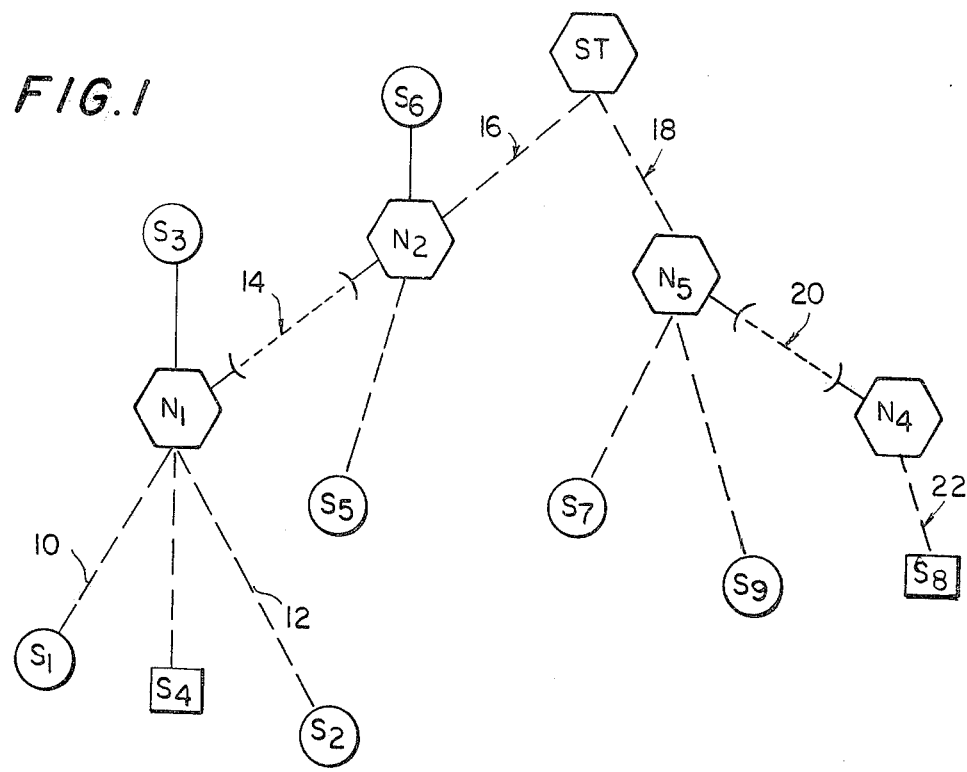
FIG. 1 is a block diagrammatic representation of the communication and control system of the invention illustrating a number of fixed and mobile subscribers interconnected through local and intermediate nodes.

Referring to FIG. 1, a typical communications systems according to the invention is shown: A number of subscribers $S_1$ through $S_9$ interconnected by fixed (indicated by solid lines) and mobile (indicated by dashed lines) transmission links with local nodes $N_1$ through $N_4$ or through satellite node ST. Each subscriber is located within the field of view of the antenna of a node which will be referred to as the local node of the particular subscriber. This relationship between subscriber and local node is indicated by the line connecting each subscriber to a node. Local communications are considered to be those in which both the called and calling subscribers are in communication via the same local node. For long distance communication, which is defined as communication between parties not communicating via the same local node, intermediate nodes are used. Communication between any two subscribers is accomplished through the establishment of complementary retrodirective oscillation loops between the calling party and the local node of the calling party, the called party and a local node of the called party and between any intermediate nodes necessary to establish the transmission path between the local nodes of the calling and called parties. If subscriber $S_1$ wishes to make a local call to subscriber $S_2$, subscriber $S_1$ selects a signal at the frequency complementary to the frequency of the signal automatically transmitted by subscriber $S_2$ and transmits that signal to node $N_1$ via, for example, mobile link 10. At the same time, node $N_1$ receives a signal at the complementary frequency from called party $S_2$ via mobile communication link 12. Node $N_1$ combines these signals and transmits a reference carrier signal to both parties $S_1$ and $S_2$. Retrodirective loops are thereby established between calling party $S_1$ and node $N_1$ and called party $S_2$ and node $N_1$ to provide a communications link between the parties. For long distance communications, for example, between calling subscriber $S_1$ and called party $S_8$, calling subscriber $S_1$ transmits a signal at a frequency complementary to the frequency automatically transmitted by subscriber $S_8$. This signal is received at node $N_1$ and transmitted via links 14, 16, 18, and 20 to Node $N_4$. Links 14 through 20 can be radio, microwave, cable or any combination. Node $N_4$ also receives the complementary signal from called party $S_8$. It generates the reference signal to parties $S_8$ via link 22 and via links 12 through 20 and in nodes $N_{3S}$, ST, $N_2$ and $N_1$ back to party $S_1$ to establish communication. Node $N_{3S}$ has the additional capability of extracting and inserting intelligence at its location for use of subscribers there, as well as relaying signals to other points in the network.

When the communication paths between the subscribers have been established, transfer of information between subscriber stations $S_1$ and $S_8$ can take place. The modulated signal from $S_1$ is designated $\Delta$ west for convenience. The $\Delta$ west signal is transmitted from subscriber $S_1$ to node $N_4$ where it is transferred to the carrier from subscriber $S_8$. Similarly, signals from subscriber $S_8$ modulated with $\Delta$ east modulation are transmitted to node $N_1$ and are then transferred to the carrier signal from subscriber $S_1$.

Figure 2:
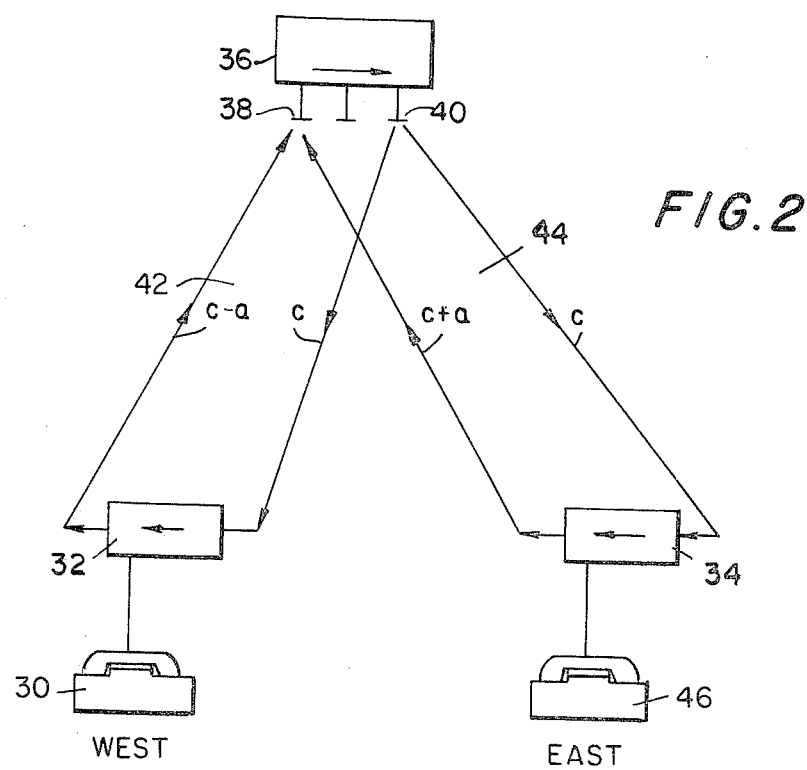
FIG. 2 is a simplified block diagrammatic representation of a single node system servicing one pair of subscribers and operating in a full duplex mode.

The system operation can be further understood by considering first the operation of the simplified illustrative system shown in FIG. 2 in which a pair of subscribers communicate via a single local node. For the purpose of explanation, assume that the called party, which will also be referred to as the East party, is assigned a called frequency of $c+a$, where c is the reference frequency and a provides an offset from the reference frequency unique to the East party. The calling party will be referred to as the West party. To place a call from the West party to the East party, the West party takes his phone 30 off hook and dials a number code which identifies the East party. The number code is received in the West party subscriber station 32 which translates the code into a local oscillator or a filter adjustment which enables a retrodirective loop to operate at a control carrier frequency $c-a$. The West control carrier signal at frequency $c-a$ and the complementary control carrier signal provided by the East subscriber station 34 at frequency $c+a$ are received in node 36 via antenna elements 38. At the node 36, the complementary control signals are combined and utilized to generate a reference carrier signal at frequency c, which is transmitted back to both the East and West parties via antenna elements 40. In this manner a communications link including two retrodirective loops, 42, 44 one between each party and node 36 is established between the parties.

It should be understood that this system does not employ independent receivers and transmitters as do conventional systems but instead, a control carrier path is established between receiving and transmitting elements of the party's subscriber stations and the node by virtue of the operation of retrodirective loops. As shown in FIG. 2, retrodirective loops are established between West party 30 and node 36 and East party 34 and node 36. Node 36 is constructed to permit communication between the parties only when complementary control carrier signals are present.

These control carrier signals are enabled by providing both loops with sufficient electronic amplification and antenna focusing power to provide greater than unity around each loop at the desired frequencies to overcome all losses. Thus, two simultaneous retrodirective oscillating loops 42, 44 will be developed ready for information to be transferred between the parties. Furthermore, all the links will be directional at both ends. Therefore, information transferred in one direction will not interfere with information transfer in other directions.

When both retrodirective loops 42, 44 are established, the signaling bell in the East party receiving instrument 46 will be actuated and the East party completes the connection by taking his phone off hook. Both parties may now use the links which have been established to transfer information between the East and West subscribers via node 36.

Information is modulated on the carrier now existing in West subscriber station 32 and is transmitted to node 36 where the retrodirective array carrier from the East station 34 is now also present. Node 36 differentiates the two carriers by their carrier frequency and also establishes the direction of the carriers by the distribution of spatial phase angles on the individual array antenna elements.

The node removes the modulation from the West carrier by a process described in more detail below and inserts it on the carrier returning to the East station 34. At the same time and by the same process the modulation from the East station is removed from the East carrier and inserted upon the West carrier being retransmitted to the West station 32. The simultaneous modulations will not interfere with each other. When the communication is complete, each party goes back on hook. The oscillator in each terminal 32, 34 is automatically returned to the assigned called control carrier frequency unique to the party. All stations are, in effect, in a ready state and emit a low level noise-like signal to the node 36 which includes energy at the party's assigned frequency. The party is again signalled when the node 36 receives a signal at a frequency complementary to the party's assigned frequency which causes the establishment of respective retrodirective loops between the parties and the nodes.

Figure 3:
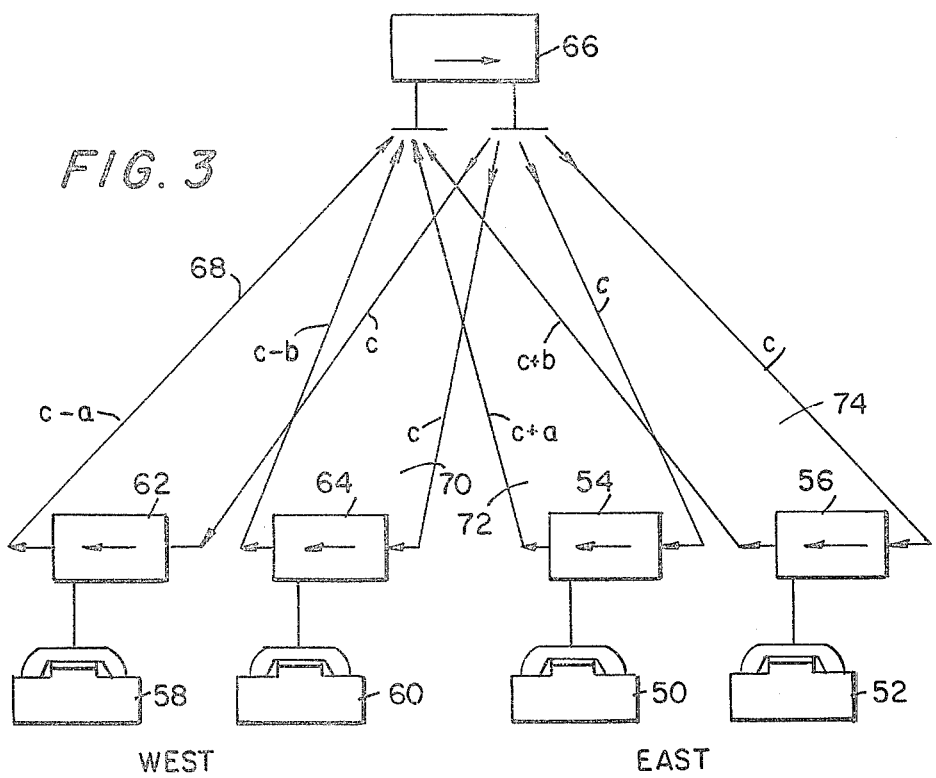
FIG. 3 is a simplified block diagrammatic representation of a single node system servicing two pairs of subscribers stations.

FIG. 3 shows the operation of the system with four parties communicating through a local node. In FIG. 3 there are two East parties 50, 52 having subscriber statisons 54, 56 respectively, and two West parties 58, 60 having subscriber stations 62, 64 respectively, communicating with local node 66 via separate communiation channels established in the node. For this description, we assume that subscriber 58 wishes to call subscriber 50 and subscriber 60 wishes to call subscriber 52 and that the calls are placed simultaneously. Subscribers 58 and 60 go off hook and dial the code number and generate and transmit to node 66 control carrier signals at frequency $c-a$ and $c-b$ which are complementary to the frequencies assigned to subscribers 50 and 52. Also received at node 66 are noise signals transmitted from subscriber 50, 52 which noise signal spectral energy include complementary frequencies of $c+a$ and $c+b$ respectively. Frequencies $c+a$ and $c+b$ are sufficiently separated to be filtered by separate band pass filters in node 66. The width of this separation also affects the build-up time of the control carrier signal since too narrow a band pass filter would delay the build-up excessively. For this reason, a minimum separation of 1,000 hz is recommended. This filtering sets up separate paths in node 66 for the control carrier signals received from subscribers 58 and 60. In node 66, the complementary carrier signals are combined and mixed to provide a common signal which passes a bandpass filter centered at frequency $2c$. This signal is used to generate a reference carrier signal at frequency c which is then transmitted back to each subscriber to establish retrodirective loops 68, 60, 72 and 74 between the subscribers and node so long as there is more than unity loop gain between each pair of subscribers. Subscribers 58 and 50 and subscribers 60 and 52 are connected via separate communications channels, since the independent paths provided in node 66 permit the four retrodirective loops 68, 60, 72 and 74 to operate simultaneously. In fact, a multitude of such retrodirective loops may operate simultaneously and independently, provided sufficient independent paths are provided in the node. As should now be apparent, these paths or channels can be easily established by providing an independent band pass filter in the node on each channel and by proper selection of the control carrier frequencies for each channel. Modulation may be originated at one station and received at the other station of the pair without interference so long as independent control carrier frequencies are provided for each subscriber. No interference will be experienced by the subscribers so long as the corresponding East and West subscribers all do not lie within the same beam width of the nodes even though the pairs use the same modulation channel allocation. This occurs because the node is made up of an array of individual antenna elements each of which includes processing units which will be discussed in greater detail. The array of processing units are capable of suppressing modulation from a direction substantially different from the direction of the carrier developed from the terminal at a given direction as will also be discussed later.

Modulation originating from and/or transmitted to directions substantially within the same beam width of the node will require a different modulation channel to avoid interference. However, subscriber stations may be assigned different combinations of control carrier and modulation frequencies so that even if subscribers are mobile and move from beam to beam, interference is minimized. For example, if the number of stations is S and the number of beam positions (control carriers) is C and the number of modulation channels is M, then the number of modulation channels (frequency assignments required) is $M=S/C$; and if M equals C, M equals S. Thus, 10,000 users may be accommodated with only 100 channels and at least 100 users may use each beam simultaneously. Only 1% of the channel allocation would be required as opposed to assigning each station a frequency as has been heretofore required. Thus significant savings in band width and/or significant increases in system capacity are readily achieved.

Figure 4:
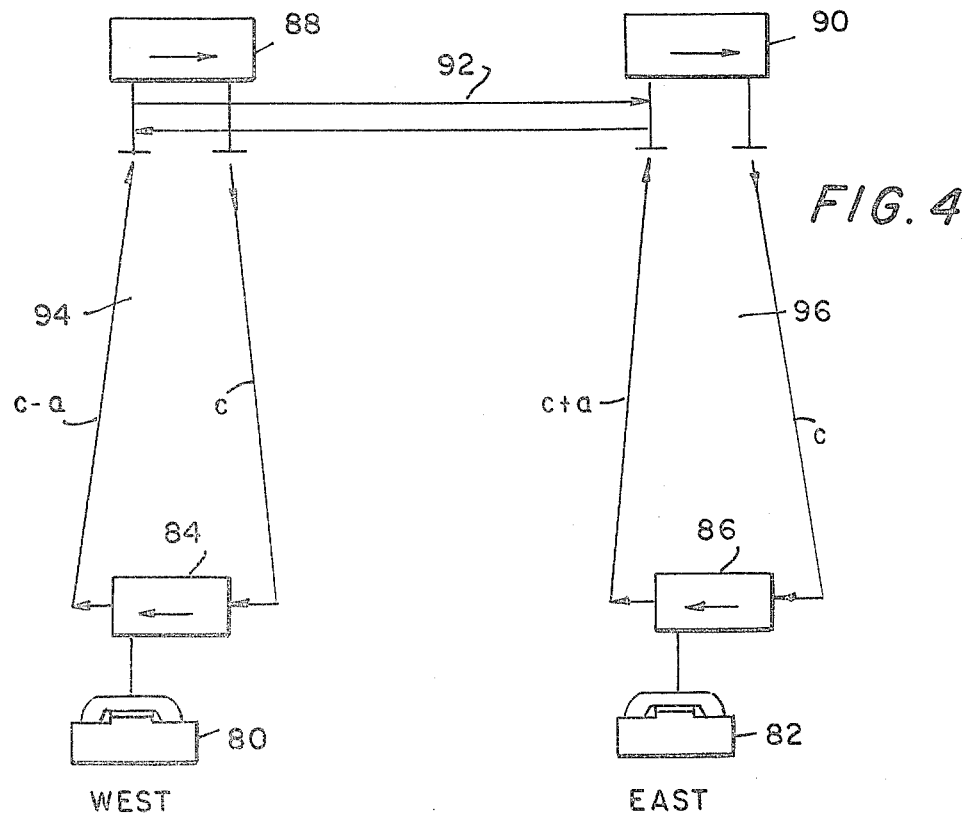
FIG. 4 is a simplified block diagrammatic representation of a two node system which illustrate the operation of the system with remote subscribers.

FIG. 4 illustrates how remote subscribers may use the system. Remote subscribers are those which do not share the same field of view of a single node but must be reached via two or more nodes. In such a case, intermediate links between nodes must be established. Thus, if subscriber 80 wishes to call subscriber 82, subscriber 80 adjusts the frequency transmitted by subscriber unit 84 in the same way as described above to generate the control carrier signal at frequency c−a which is complementary to the tuned frequency of subscriber unit 86 associated with subscriber 82. Node 88 receives the control carrier at frequency c−a and is equipped with an antenna containing directional couplers which permit the control carrier signal received by node 88 to be transmitted to node 90 via communications channel 92 which may be a microwave link or a cable. In essence, node 88 upon receiving a control carrier signal automatically attempts to find the subscriber anywhere in the system which is set up to generate the complementary control carrier signal. In the systems of FIGS. 2 and 3, the subscriber was found coupled to a local node. In the system of FIG. 4, the node had to seek the desired subscriber at a distant node. This operation would automatically take place through as many intermediate nodes as would be required to establish a connection between subscribers. FIG. 4 shows the use of two nodes for illustrative purposes only. At node 90, a noise signal generated by subscriber 82 continuing frequency c+a is received, applied to the input of node 90 and also transmitted to node 80 via link 92. Receipt of the complementary signal in node 88 enables the signal to pass through node 88 and provide a reference signal at frequency c, which is transmitted to subscriber station 84. Similarly, a signal at frequency c−a from node 88 originating in subscriber station 84 complements a signal at frequency c+a received at node 90 from subscriber station 86 enabling the signal at frequency c to be sent to subscriber station 86 to complete the loop. Retrodirective loops 94, 96 are enabled by sufficiency of gain around each loop offsetting any losses including those incurred in path 92 and 94. Modulation from subscriber station 84 can now be transferred to the control carrier at frequency c in node 90 and transmitted to subscriber station 86. Similarly, modulation can be transferred to carrier c from node 88 directed to subscriber station 84.

Figure 5:
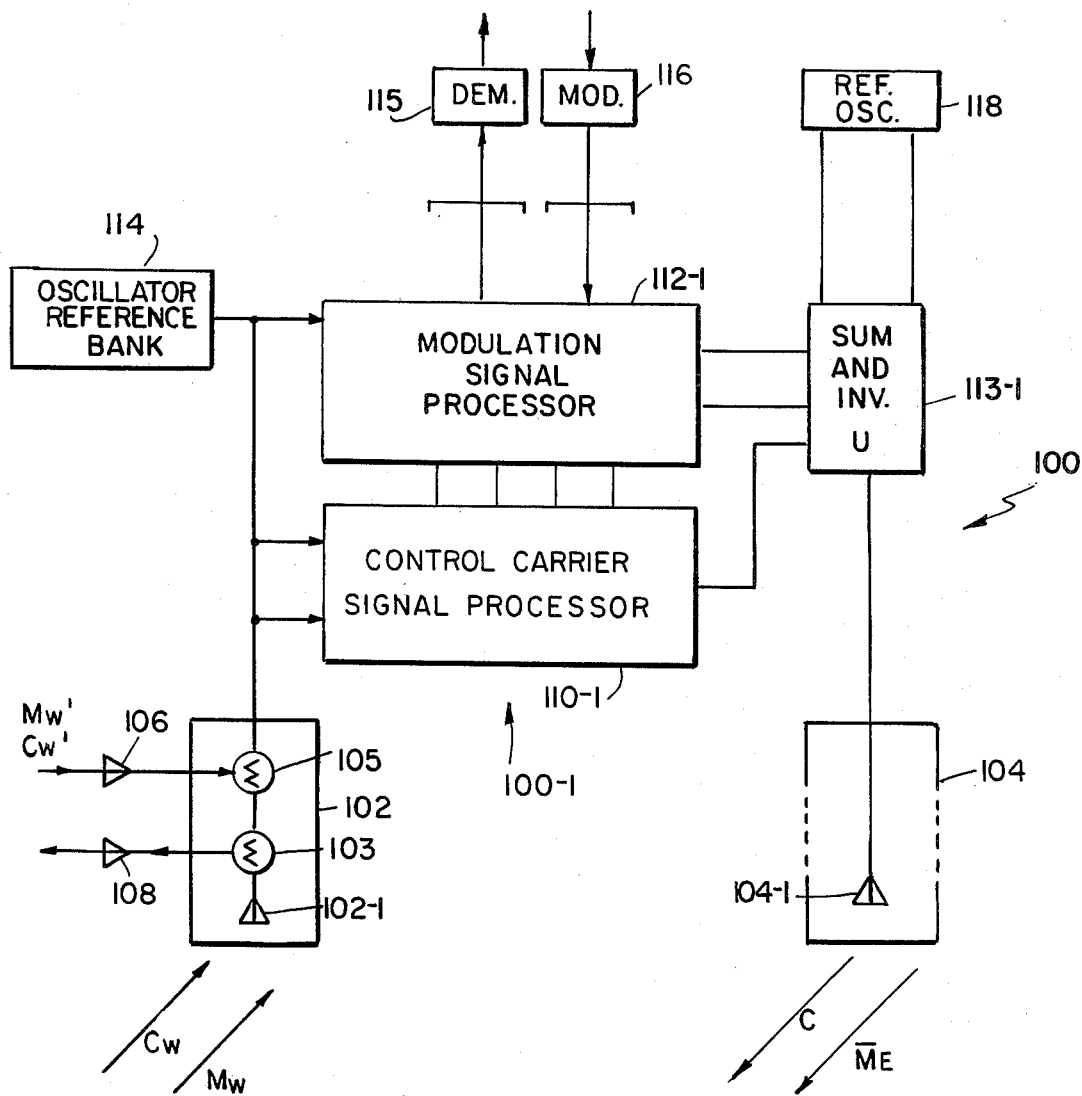
FIG. 5 is a block diagrammatic representation of a typical single element of a node in the communication system for establishing the connection and for receiving and transmitting information between a calling and called subscriber.

The typical node 100 of the system (examples of nodes are $N_1$, $N_2$, $N_3$ of FIG. 1, 36 of FIG. 2, 66 of FIG. 3, 88 and 90 of FIG. 4) is composed of one or more identical node elements. FIG. 5 shows such a typical node element, referred to as 100-1. Each node will contain n node elements each comprising circuitry. The series of elements will be referred to as -1, -2 . . . The nodes elements (100-1, 100-2 . . . 100-n) are all connected to a common single oscillator unit 118 which is required to invert the spatial phases of signals for re-transmission back to the terminal units to complete the retrodirective oscillating loops. Each node includes a receiving antenna 102 and a transmitting antenna 104; each node element includes, for example antenna elements, 102-1 and 104-1 respectively. When the physical spacing between antenna elements 102-1 . . . n and 104-1 . . . n are properly spaced (usually less than 0.9 of the wavelength of the frequency being received or transmitted by the node) the energy received or transmitted will be concentrated into discrete beams in accordance with the well known principles of operation of phased arrays. These beams will be directed in accordance with the repetitive phase differences received at the different elements 102-1, 102-2, 102-3 . . . 102-n. We will refer to this phase difference from the West station as $\phi$ and that from the East station as $\theta$.

Each element node 100-1, 100-n may be equipped to handle "m" duplex channels. To do so each node must be equipped with duplicates of modulation signal processor 112 and control signal processor 110. By duplex channel is meant a channel connecting two terminals (stations or subscribers) which can carrier information simultaneously from each terminal to the other. Each such channel requires a different set of complementary frequencies. The following description describes the functioning of a single duplex channel. The operation of multiple channels can then be readily inferred from the description of one channel.

The numbers of node elements 100-1, 100-2, 100-3 . . . 100-n which are used in a given node is dependent primarily on the number of desired independent beam directions. The particular dependency is determined by the type of phased array used, but in the case of planar arrays "n" node elements are used for "n" beam directions within the field of view of the array. The field of view of the array is the angular volume over which signals may be received from and transmitted to the node from the stations and is principally determined by the element antenna pattern of 102 and 104. (Other arrays which can be used include spherical and cylindrical arrays. These arrays have wider field of views than the planar array). An example situation would be a node field of view of 60° and a node beam width of 6° indicating 10 independent beam directions within the node field of view. Thus 10 terminal stations may use the same frequency band without any interference whatsoever when they each are located in a different beam. Also each user will receive the benefit of the antenna gain implied by the narrow 6° beam. This greater gain permits a higher information transfer for the same transmitted power and distance between node and user.

The local node 100 is capable of providing multiple communication channels for communications among subscribers within the field of view of the node, the field of view being the angular sector over which node element antennas 102-1 . . . n and 104-1 . . . n can physically receive and transmit, and between remote subscribers, which are subscribers not within the field of view of a single local node. Signals from local subscribers in direct communication with node 100 are received by receiving antenna 102-1 . . . n and transmitted to these subscribers by transmitting antenna, 104-1 . . . n. These antennas receive directionally from subscribers at arbitrary directions with respect to the antenna and transmit to the subscribers in the corresponding directions. For communications between remote subscribers, directional antennas 106 and 108 receive and transmit signals from other nodes and are connected to antenna 102 in a manner to be described in more detail below.

FIG. 5 shows a single node element 100-1 including a single antenna elements 102-1, 104-1, control carrier signal processor 110-1 and modulation signal processor 112-1. These elements work cooperatively to generate the complementary retrodirective loops and to transfer information to the complementary stations which communicate with each other. As mentioned before a separate set of processors 110 and 112 is required in each node element 100 for each set of m complementary transmission paths or channels which the system is to be capable of establishing. The West originating control signal for the first node element will be referred to by the notation "$C_{w1}$". The West originating modulation signal for the first node element will be referred to by the notation "$M_{w1}$". The East originating signals will be referred to by the subscript "E". The "nth" element will be referred to by the notation n.

Antenna element 102-1 receives West control and modulation signals Cw1, Mw1, respectively, at a spatial phase angle with respect to a reference point $\phi_1$, whereas East control and modulation signals CE1, ME1 are received at spatial angle of $\phi_1$. Similarly, antenna element 102-n receives signals $C_{Wn}, M_{Wn}$ at an angle $\phi_n$ and $C_{En}$, $M_{En}$ at an angle $\phi_n$.

Each antenna element 102 is equipped with a power divider 103 for permitting signals, delivered to directional antenna 108 to be transmitted to a remote node. The signal is also applied to control carrier signal processor 110 and modulation signal processor 112 via splitter-summer 105. Signals $C'_W$, $M'_W$ from a possible complementary subscriber located near a remote node are received via antenna 106, splitter-summer 105 and are also directed to control carrier signal processor 110 and modulation signal processor 112. Splitter-summer 105 may also be a directional coupler as is well known in the art.

Control carrier signal processor 110-1 operates with one set of antenna elements 102-1 and 104-1. Hence, there are n control carrier signal processors, for each channel. Similarly, modulation signal processor 112-1 operates with one set of antenna elements 102-1 and 104-1. Hence, there are also n modulation signal processors for each channel.

Receiving antenna 102 is coupled to control carrier signal processor 110, which processes carrier control signals $C_E$ and $C_W$ received respectively from the East and West subscribers between which communication is to be, or is established. As explained above, the frequency of signal $C_{E1}$ (equal to $C+a$) is complementary to the frequency of signal $C_{W1}$ (equal to $c-a$). When the signals are combined in control carrier signal processor 110-1 they yield a signal whose frequency is 2c. If the spatial phase of signal $C_{W1}$ at a given element of antenna 102 is $\phi_1$ and the spatial phase of the signal $C_{E1}$ at antenna 102 is $\phi_1$ then the spatial phase of the resulting signal is $\phi_1 + \theta_1$. Spatial phase is used herein to mean the phase of the sine wave radio frequency signal received at one location within the node with respect to the phase of a signal received at another reference location within the node. For convenience, the frequency of the resulting signal is translated to reference frequency c in the control carrier signal processor 110-1. The resultant reference carrier signal at reference frequency c is transmitted via antenna 104 to both the calling and called subscribers.

Wherever carrier or modulation signals are referred to, a simplified notation will be adopted. Instead of referring to a signal as $Ae^{j(c-a+\Delta West)t+\phi}$, for simplicity it will be referred to only by the exponential term. Thus, the above signal would be referred to as $c-a+\Delta west+\phi$. The reference to time, t, is dropped because it is not needed for the explanation. $\Delta$ west is equivalent to Mw when the modulation is in the form of phase or frequency modulation. While the description shows how the system works when using exponential modulations (phase or frequency), the system will also work with amplitude modulation.

Inverter 113-1 receives input from oscillator 118, inverts the spatial phases of the signals received from elements 102 before transmission via antenna 104 as described more fully below. Two retrodirective oscillating loops are established simultaneously, one between the calling subscriber and the calling node, and the other between the called subscriber and the called node, provided that the loop gain in each path exceeds unity and that at the frequency of operation, the net phase shift around the loop is zero or a multiple of 360 degrees. Part or all of the required gain can be provided by control carrier signal processor 110 as will be described in more detail below.

Information signals are received and transmitted via separate modulation channels. Modulation received via antenna 102 is processed in modulation signal processor 112 which receives modulation from both the calling and called subscribers and uses control carrier signals $C_W$ and $C_E$ received from control carrier signal processor 110 to provide signal products for redirection to the complementary user i.e. modulation from the west subscriber is retransmitted only to the called subscriber, East, via control carrier $C_{E1}$ as will be described in more detail hereinafter.

Modulation signal processor 112 also provides modulation output to the node and receives modulation for retransmission from the node when there are subscribers located at the node or when connection to an external communications system, such as the public telephone network is desired. In the latter case, a signal at frequency $c+a$ is provided to the control carrier signal processor 112 from oscillator reference bank 114. This signal, together with a complementary control signal $C_W(c-a)$ received from a west calling subscriber either within the field of view of the node, or from a distant node, will develop a signal with frequency 2c in control carrier signal processor 110 to be used to generate a control carrier of frequency c for transmission back to the stations and thus enable a retrodirective oscillating loop to exist between the node and the calling or called party. Demodulator 115 and Modulator 116 are provided to extract the intelligence signals destined for the node location and to insert intelligence for transmission to the specific subscriber.

Figure 6:
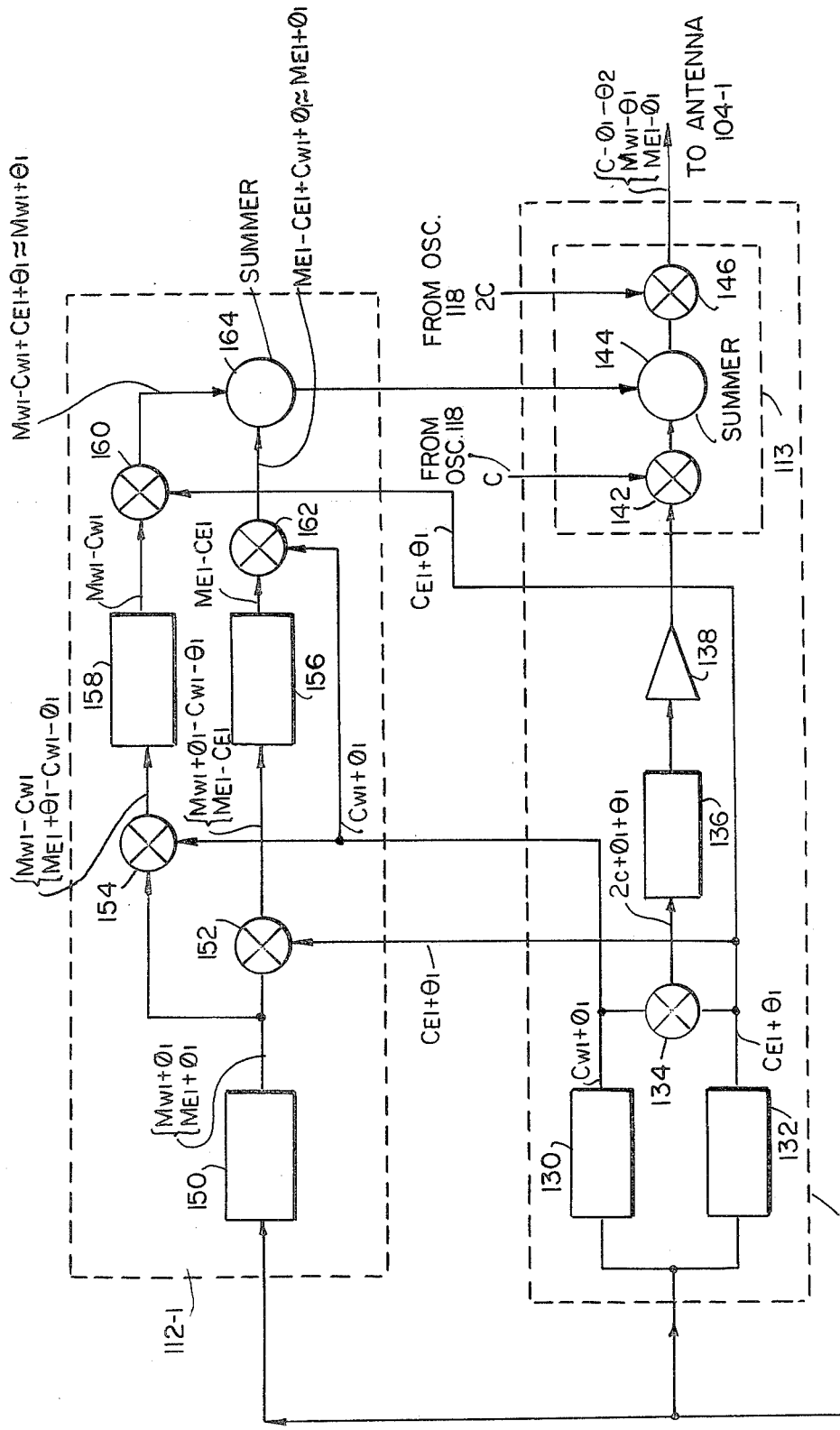
FIG. 6 is a diagrammatic representation showing the control carrier processing unit and the modulation processing unit and the interconnection between the units of the typical single element of the node shown in FIG. 5 for processing one pair of subscribers operating in full duplex mode.

FIG. 6 shows a control carrier signal processor 110-1 and a modulation signal processor 112-1 in greater detail. Referring to FIG. 6, control carrier signal processor 110-1 includes band pass filters 130, 132, which are respectively tuned to the frequency $C_{W1} = (c-a)$ and $C_{E1} = (c+a)$. The output of filters 130 and 132 are applied to mixer 134 which multiplies these signals to provide the output product, $2c + \phi_1 + \theta_1$ Bandpass filter 136 is tuned to frequency 2c and filters out all other unwanted frequency components. The signal from filter 136 is amplified by amplifier 138 and applied to inverter/summing unit 113. A signal from common reference oscillator 118 at frequency c is mixed in mixer 142 with the output of amplifier 138 to produce the reference control carrier at frequency c which passes through summer 144 and mixer 146 and is transmitted via antenna 104-1 to both the called and calling party, whether or not modulation is present.

The output of filters 130 and 132 are also applied to modulation signal processor 112. Modulation signal processor 112 includes filter 150 which separates the East going and West going modulations $M_{W1} + \phi_1$ and $M_{E1}+\theta_1$ respectively and delivers this signal to mixers 152 and 154. Mixer 152 mixes the signal received from filter 132 with the signal from filter 150 to produce signal products $M_{W1}+\phi_1-C_{E1}-\theta_1$ and $M_E-C_E$. The second product represents an in-phase component, that is, all such products in all n of the modulation signal processors 112 will be in phase with each other. On the other hand, the $M_{W1}+\phi_1-C_{E1}-\theta_1$ product has a variable phase angle $\phi_1-\theta_1$. in each modulation signal processor and hence will not reinforce as will the first products. Hence, only the in-phase products will be effectively coupled through filter 156.

Similarly, mixer 154 mixes the signal $C_{W1}+\phi_1$ from filter 130 with the modulation signals $M_{E1}+\theta_1$ to obtain the signal $M_{E1}+\theta_1-C_{W1}-\phi_1$ and $M_{W1}-C_{W1}$ which are input to filter 158. Only the second of these products is effectively coupled through filter 158.

The output of filter 158 is mixed, in mixer 160 with the signal $C_{E1}+\theta_1$ from filter 132 and the resultant product is $M_{W1}-C_{W1}+C_{E1}+\theta_1$. This resultant is approximately $M_{W1}+\theta_1$ because $C_{E1}-C_{W1}$ is a small negligible constant offset term, and the resultant is the modulation from the calling or West subscribers station redirected to the complementary East or called station by virtue of the angle $\theta_1$. Similarly, the output of filter 156 is mixed in mixer 162 with the signal $C_{W1}+\theta_1$ from filter 130 to form the signal $M_{E1}-C_{E1}+C_{W1}+\theta_1$ or approximately $M_E+\theta_1$.

These signals are added in summer 164 and the summed signal supplied to the summer 144 of summer-inverter 140 where they are added linearly to C in summer 144. Signals from common reference oscillator 118 of frequency 2C are used to provide spatially phase inverted output signals $C-\phi_1-\theta_1$, $M_{E1}-\phi_1$ and $M_{W1}-\theta_1$ from mixer 146. These signals will be directed by phased array operation back to the respective subscribers except that modulation signal $M_{W1}-\theta_1$ will be directed to the East and $M_{E1}-\theta_1$ to the West station because they are inverted in spatial phase and because the Mw signal now is associated with the spatial angle 2C of the east terminal and $M_E$ with $\phi$ of the west terminal as described more fully below. In order for carrier control signal at frequency 2C from filter 136 to be transmitted at frequencies similar to the carrier frequencies of the modulation signals $M_{W1}$ and $M_{E1}$ it is desirable to translate its frequency. Reference oscillator 118 supplies the signal of frequency C which is applied to mixer 142 which translates the frequency to the modulation frequency C without affecting the spatial phase $\phi_1$ or $\theta_1$. Reference oscillator 118 also supplies a signal at frequency 2C which mixes with the summed signals in summer 142 and provide the output products $C-\theta_n-\phi_n.\phi_{W1}-\phi 1$ and $M_{E1}-\theta_1$. The phases of the signals at frequency 2c from reference oscillator 118 are the same for all inverters 113.−1 . . . n.

Figure 7:
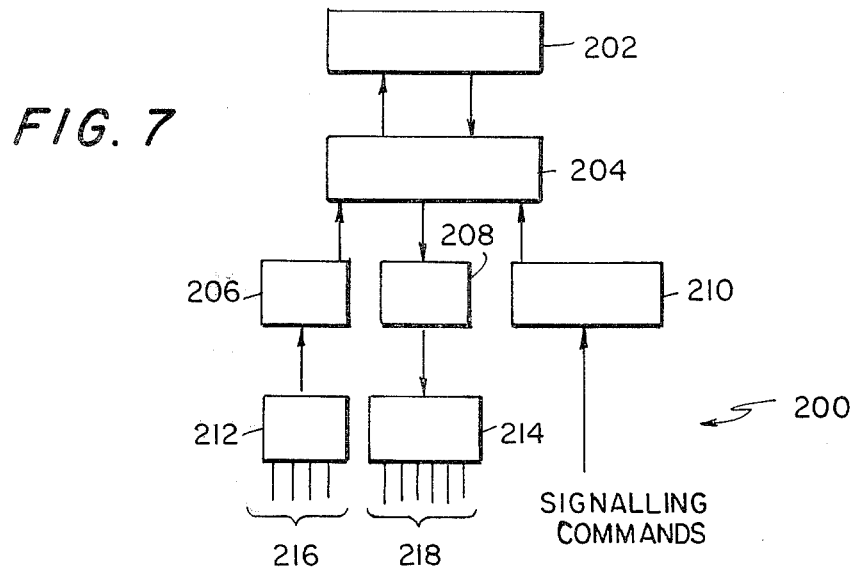
FIG. 7 is a block diagrammatic representation of a typical subscriber station.

FIG. 7 shows a block diagrammatic representation of a typical subscriber station 200. For the purposes of explanation this subscriber unit will be considered the East or called subscriber. Antenna unit 202 may be a combined receive/transmit unit or may be composed of separate receive and transmit units. The antenna unit 202 may be either a directional antenna or a retrodirective array. A directional antenna could be used when the subscriber station is fixed and knows the node direction. Both the modulation signals and control carrier signals are transmitted and received through antenna Unit 202. Signal processing unit 204, which will be described later converts and amplifies the control carrier signals in a manner similar to the control carrier signal processor 110. Should the subscriber unit receive the reference control carrier at frequency c it will respond with the control carrier signal at frequency $C_E$ completing the retrodirective oscillating loop between the subscriber station and its local node station.

Modulation unit 206 provides modulation $M_E$ for transmission from subscriber unit 200. Demodulation unit 208 demodulates modulation $M_W$ received from the other party. Selector 210 selects the complementary control carrier frequency $C_E$ which will set up the communications path between this subscriber station and the complementary West subscriber station. Multiplexer 212 and demultiplexer 214 may be used to permit several users, indicated by lines 216 and 218, to share the same transmission path and modulation channel. It will be understood that except as described below, the elements of the typical subscriber station 200 are of conventional design.

Figure 8:
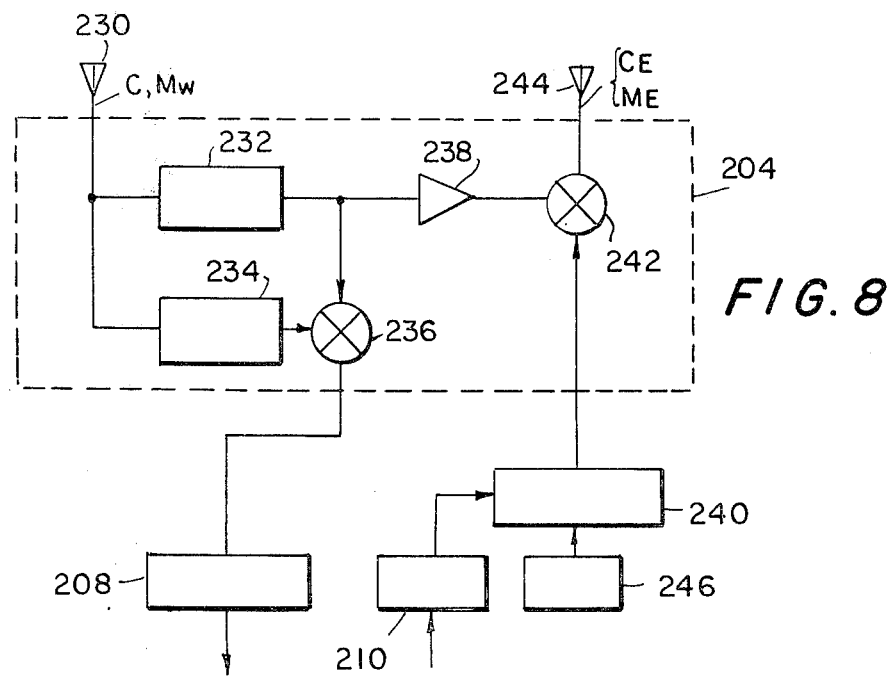
FIG. 8 is a diagrammatic representation of a carrier signal processing unit at the subscriber station having separate control carrier and modulation channels with one antenna array element pair.

FIG. 8 shows the subscriber station and in particular the signal processor 204 in more detail. It is understood that the signal processor is for one array element pair. In cases where the subscriber station uses a conventional directional antenna, only one element pair is used. However, when retrodirective array terminals are used, n pairs are required in a similar manner as described for node 100. The reference carrier signal at frequency C and modulation signal $M_W$ received at antenna 230 are separated by filters 232 and 234 respectively. These signals, which have a spatial phase angle dependent upon direction signals are received, are applied to mixer 236. The resultant signal has zero phase angle and may be summed with other signals from other subscriber station array pairs. The summed signals from mixers 236-1 . . . n are demodulated in discriminator 208.

The control carrier signal is amplified in amplifier 238 to provide loop gain for carrier buildup. The selection unit 210 selects the frequency of oscillator 240. If the subscriber wishes to call another party, the frequency $C_E$, (c+a) complementary to that party's frequency is selected. If "on hook" or "idle", the subscriber's own frequency is set to permit the station to be called by any other party sending the complementary frequency.

The output of oscillator 240 is mixed with the output of amplifier 238 in mixer 242 to provide transmitted output to antenna element 244. Amplifier 238 is preferably of the limiting type. The signal from oscillator 240 is modulated by modulator 246 with modulation signal Mw and oscillator 240 supplies modulation and carrier signals to all the elements in the subscriber's antenna array. The frequency of oscillator 240 is selected so that mixer 242 provides a spatially phased inverted output to antenna element 244 with respect to signals received by element 230 so that transmitted signals may be transmitted in the direction from which the control signal was received.

Figure 9:
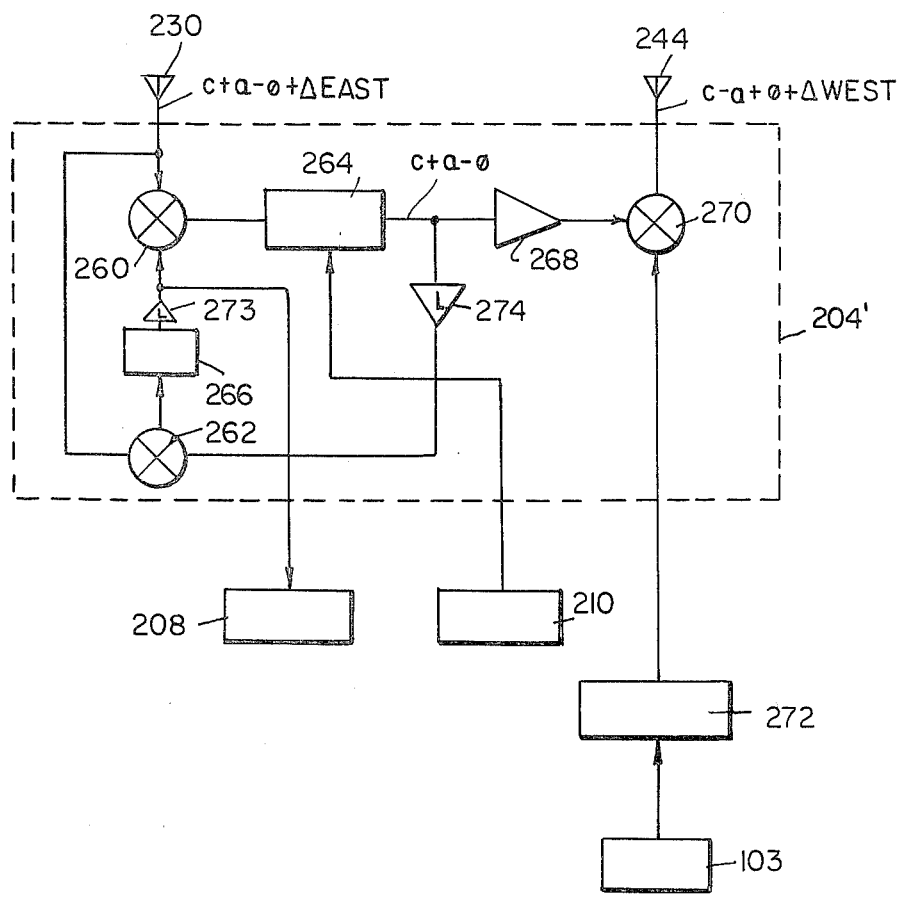
FIG. 9 is a diagrammatic representation of another embodiment of a subscriber station carrier signal processing unit for use when the carrier and modulation occupy the same frequency channel.

FIG. 9 shows another embodiment of the signal processor 204' of the subscriber station in which the frequency of the control carrier is located in the same frequency band as the frequency of the modulation signal. The subscriber substation operates with the node shown in FIG. 11. Signals received from an antenna element 230 are applied to both mixers 260 and 262. If the correct carrier signal is present it will be delivered to narrow band filter 264 which passes the carrier signal to mixer 262, via limiting amplifier 274. FIG. 9 shows a West station. The total signal, modulation and carrier, $C+a-\phi'+\Delta$East, received, mixes with the carrier signal in mixer 262 to provide a modulation frequency product, $\Delta$East, which passes through modulation band pass filter 266 and via limiting amplifier 273 to mixer 260. This signal mixes with the input signal in mixer 260 to provide an input to filter 264 which retains the spatial phasing of this signal as received while at the same time producing a modulation signal of frequency $\Delta$East, which has a spatial phase of zero. This signal is summed with all such similarly in-phase signals from other element pairs and applied to discriminator 208 for demodulation.

At the same time, the carrier signal $c+a-\phi$ from filter 264 is amplified by amplifier 268 and is transmitted around a retrodirective loop via mixer 270 and antenna 244. Amplifier 268 is preferably a limiting amplifier. Oscillator 272 provides a signal at frequency $2c$ to the mixer 270. The frequency of this signal is approximately twice the received reference carrier frequency, the difference being the prescribed reference offset frequency. The resultant transmitted signal $c-a+\phi'$ is inverted in spatial phase with respect to the input signals. Oscillator 272 is also modulated by modulator 246 and supplies the modulated signals to all array elements, so that the resulting signal is $c-a+\phi'+\Delta$West.

Selector unit 210 controls the band pass frequency of carrier selector filter 264. When idle, the subscriber unit is set to receive its prescribed frequency so that other parties may call it. When calling, the selective unit sets the frequency to that of the desired party as in the present case.

Figure 10:
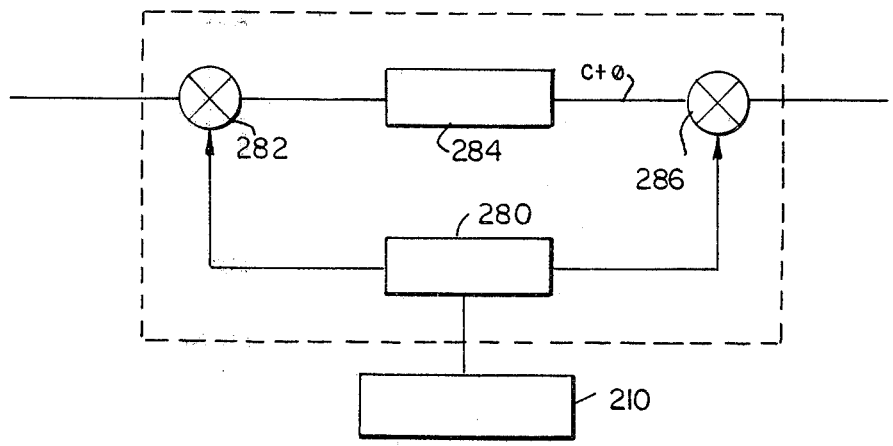
FIG. 10 is an alternative embodiment of a carrier selection filter of a subscriber station carrier signal processing unit.

For convenience it may be preferable to adjust one oscillator frequency rather than tuning several filters. In that case, filter 264 may be replaced by the arrangement of FIG. 10. Offset oscillator 280 provides a signal at a frequency controlled by selection unit 210. When a given offset frequency, $a$, is selected it mixes in mixer 282 with the incoming signal $c+a+\phi'$ from mixer 260 (FIG. 9) has a frequency $c$ with spatial phase $\phi'$ and can pass through fixed narrow band pass filter 284 to produce an output signal $c+\phi'$. The output of filter 284 mixes in mixer 286 with the offset signal from offset oscillator 280 to produce the signal $c+a+\phi'$ which is the desired output.

Figure 11:
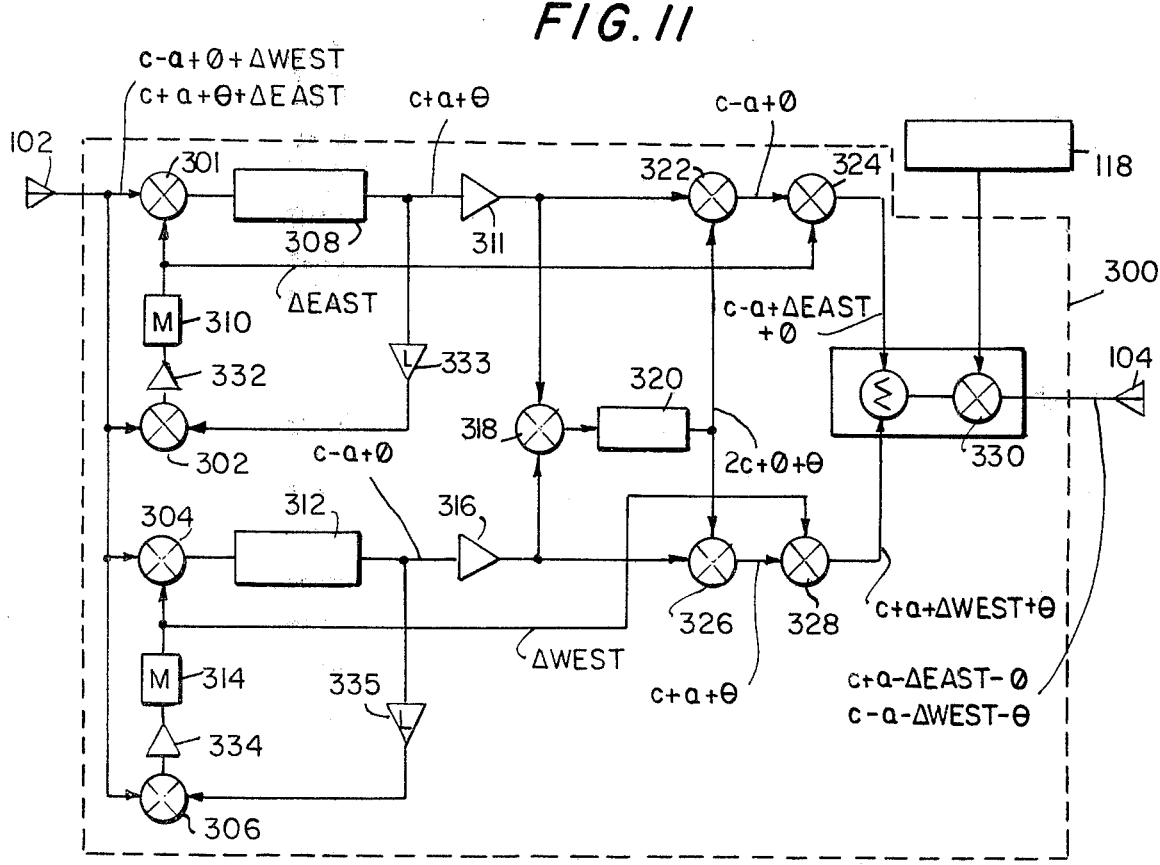
FIG. 11 is a diagrammatic representation of an alternate embodiment of a single duplex channel of a node showing modulation and carrier processing units for each array element pair, for use when modulation and carrier occupy the same frequency channel.

FIG. 11 shows another embodiment of a processing unit 300 used at the node element 100 with a modulation separation system in which the control carrier frequency lies within the modulation band if desired. When carrier frequency is in the modulation band this node processor must be used with the subscriber station of the type shownn in FIG. 9. The processing unit 300 shown in FIG. 11 would replace both the control carrier signal processor 110 and modulation signal processor 112.

Signals from the antenna element 102, $c-a+\phi\Delta$West and $c+a+\theta+\Delta$East, are applied to mixers 301 and 302 which receives the East modulation channel from a pair of stations, and mixers 304 and 306 which receive the West channel. Mixer 301, filter 308, and filter 310, and limiting amplifiers 332 and 334 operate to generate carrier $C_E$ of frequency $c+a$ when the retrodirective oscillating loop is properly completed with a subscriber station to provide the signal $c+a+\theta+\Delta$East to the antenna 102 input. At the same time, modulation $\Delta$East, with no spatial phase, is developed at the output of filter 310. Carrier $C_E$ at the output of filter 308 retains the spatial phase $\theta$ of the input signal and is delivered to linear amplifier 311. This is the path of the retrodirective oscillating loop and the amplifier 311 provides gain for sustaining the chosen carrier.

In a similar fashion, control carrier $C_W$ of frequency $c-a$ is extracted from the incoming signal of frequency $c-a+\phi+\Delta$West by the operation of mixer 304, limiting amps 334 and 335, filter 312 and mixer 306. Filter 312 passes only frequencies close to $c-a$ and preserves the spatial phase angle $\phi$. When this signal mixes with the incoming signal $c-a+\phi+\Delta$West in mixer 306 the difference frequency resultant is $\Delta$West, having no spatial phase angle, which is the output of filter 314. The output of filter 312 feeds amplifier 316 which is used to develop the control carrier $C_W$ by providing gain to the retrodirective oscillating loop between the node and the West station. So that the West station may activate the East station, the two loops between the stations and the node are simultaneously activated. For this purpose the signals from amplifiers 317 and 316 are supplied to mixer 318. The resultant sum frequency signal is selected by filter 320 and is $c+a+\theta+(c-a+\phi)=2c+\theta+\phi$. This signal is mixed with the output of amplifier 311 in mixer 322 and the desired resultant is the difference signal $2c+\theta+\phi-(c+a+\theta)=c-a+\phi$ This signal is mixed with the output of filter 310, $\Delta$ East, in mixer 324 to produce $c-a+\phi+\Delta$ East. At the same time the output of amplifier 316 is mixed with the output of filter 320 in mixer 326 to produce $2c\pm\theta+\phi-(c-a+\phi)=c+a+\theta$ and this signal is mixed in mixer 328 with the modulation output of filter 314 to produce the signal $c+a+\theta+\Delta$ West.

At this point modulation from the West has been transferred to the East and vice versa since, for example, $\Delta$ West was associated at the input with the spatial angle $\phi$ and it is now at this point associated with spatial angle $\theta$, the spatial angle received from the East. In order for this modulation to be transmitted to the East, it is necessary for the sense of the spatial angle to be inverted i.e. changed to $-\theta$, as it is well known in the art that for a retrodirective array to transmit to a direction from which it receives the phase sense of signals on the array elements must be reversed (inverted). Inversion is accomplished by mixing these signals in mixer 330 with signals from reference oscillator 118 whose frequency is $2c$. The resulting outputs to antenna element 104 are $2c-(c-a+\Delta$ East$)=c+a-\phi-\Delta$ East and similarly $c-a-\theta-\Delta$ West.

It is now apparent that signal $c+a-\phi-\Delta$ East will be sent to the West terminal because $\phi$ represents the spatial angle of the direction of the West terminal. $c+a$ is the frequency of the carrier $C_W$ receivable at the West terminal but it will bear $\Delta$ East, the modulation originated at the East terminal. Similarly the signal $c-a-\theta-\Delta$ West will be sent to the East terminal station because it contains $\theta$ which represents the spatial angle received from the East direction. The transmitted carrier $C_E'$ will be of frequency $c-a$ and will bear modulation $\Delta$ West. The node will thus properly redirect modulations between pairs of terminal stations on the basis of proper frequency designator $a$ which may take on many values A1, A2 A3, . . . An. Each value will set up a specific pair. The node element should contain a single unit equivalent to FIG. 11 for each value of A (and duplex channel to be used), as previously pointed out, to avoid cross modulation between channels.

Note that in this embodiment of FIG. 11 only two modulated signals are transmitted per duplex channel;

i.e. $c+a-\Delta$ West and $c-a-\Delta$ West instead of three signals; i.e., modulations $M_e$, $M_w$, and carrier c transmitted in the embodiment of FIG. 6.

Conferencing between stations is effected by a station initiating calls to several other stations in the same manner as previously described. The conference initiating party then bridges his instrument across the inputs and outputs of the several channels.

If it is desired that each party may independently talk to all other of the conferring parties, then each terminal will call up the other remaining conferees after the conference is initiated.

Another conferencing method is to assign the same channel designator A1 to several stations, say ten. Then when any of the stations is called all these stations will answer and all will be able to receive and transmit information from and to the other parties.

It is usual practice to provide an offset in frequency between transmission and reception in order to prevent the transmitter power from interfering with the weak received signals. This requirement has not been emphasized in the above explanation and description of the invention in the interest of simplification. Such offset frequency is readily provided, by, for example adjusting the reference oscillation 118 in the nodes to be offset from 2c by an amount z. Similarly the subscriber station oscillators 240 may be adjusted to provide for the correct matching offset to allow the retrodirective loops to operate with separated up and down frequency bands.

The offset z may be made different for different communication paths. For example, a subscriber station may be within the field of view of two nodes. Each node is capable of transmitting to the subscriber on the same frequency channel. But Node A requires an offset of $z_a$ to complete the loop whereas Node B use a different offset $z_b$. The subscriber may choose which path by choosing the offset frequency even though his receiving frequency remains the same.

This operation has practical importance in situations where two subscribers lie in the same direction with respect to a Node A but not with respect to a Node B. If the two encounter interference using the same received frequency channel one may switch the offset of his station so as to receive from the other node. In effect, this makes possible much greater frequency reuse.

Similarly, a subscriber station may not only be assigned a specific receive frequency f but also a specific offset z. Then the number of subscriber channels would be $n_f n_z$, where $n_f$ is the number of different frequency assignments and $n_z$ is the number of offset assignments.

In mobile cases if $n_z$ is made equal to the number of independent beam positions no interference will occur if the number of subscribers equals $n_f n_z$ and they are uniformly distributed. This leads to a potential reduction in frequency assignments to $\sqrt{n}$ to serve n subscribers.

Interferometric methods well known in the state of the art may be used at the nodes and retrodirective terminals to observe spatial phase angles between array elements and to determine from these observations the direction from which signals are being received. The present invention facilitates such measurements because the carrier signals are readily identified. Furthermore, because the system requires a complete loop to operate, modulation signals may be sent around the loop to determine distance from time delay observation between subscribers and intermediate nodes. These data can be used to compute the location of communicating subscribers.

What has been described are presently preferred, hence, illustrative embodiments of the invention. Those skilled in the art will immediately recognize that modifications can be made while still coming within the scope of the invention which has been described and which is set forth in the claims.

What I claim is:

1. A communications system having at least one retrodirective node station and at least a pair of subscriber stations for establishing a communications link between said subscriber stations to permit said subscriber stations to interchange information comprising means for establishing first and second interdependent retrodirective oscillating loops between respectively one of said subscriber stations and said retrodirective node and said other subscriber station and said retrodirective node by controlling the energy characteristics of the link between the first subscriber station and the retrodirective node for combination with the energy characteristic of the link between the second subscriber station and the retrodirective node to bring about the substantially simultaneous establishment of said first and second retrodirective oscillating loops, and means in said retrodirective node for receiving information directed to said subscriber stations whereby said subscriber stations can interchange information.

2. The communications system of claim 1, wherein said means for establishing said retrodirective oscillating loops includes means for establising a transmit and receive signal having frequencies which are selectively offset to enable communication between selected subscribers.

3. A communications system including at least one retrodirective node station and at least a pair of subscriber stations each identified by a particular signal frequency for establishing a communications link between said subscriber stations to permit said subscriber stations to interchange information, comprising, means at first subscriber station for providing a signal having a frequency related to the particular signal frequency associated with the second subscriber station, and means in said retrodirective node responsive to the signal of said first subscriber station and a signal provided by said second subscriber station for combining and processing these signals and for transmitting signals at particular frequencies to each of said subscribers to establish substantially simultaneously interdependent retrodirective oscillating loops between the subscriber stations and the retrodirective node whereby information can be transferred between subscriber stations by way of the retrodirective node.

4. A retrodirective node for use in a communication system including at least two subscriber stations, said retrodirective node comprising antenna means for receiving a first control carrier signal of the characteristic frequency transmitted by one of said subscriber stations and a second control carrier signal from said second subscriber station having a frequency related to the characteristic frequency of said first signal, a control carrier signal processor coupled to said antenna means for receiving said first and second control carrier signals and for combining said first and second control carrier signals to produce control carrier signals at particular frequencies, and antenna means coupled to said control carrier signal processor for transmitting a control carrier signal at one of the particular frequencies to each subscriber station whereby interdependent retrodirective oscillating loops are established substantially simultaneously between the ssubscriber stations and the retrodirective node to permit communications between subscriber stations.

5. A retrodirective node for use in a communication system including at least two subscriber stations, said retrodirective node comprising first means for receiving from the respective subscriber stations first and second control carrier signals having related frequencies, second means for combining said first and second control carrier signals to produce reference carrier signals at particular frequencies and correct phase for transmission to each subscriber station thereby establishing substantially simultaneously interdependent retrodirective oscillating loops between each subscriber station and the retrodirective node, and third means coupled to said first means for receiving information containing signals from the subscriber stations, said third means combining an information signal from one of said stations with a control carrier signal from the other said station to direct the information containing signal from one subscriber station to the other subscriber station to enable communication of information between subscriber stations.

6. The retrodirective node according to claim 5, wherein said third means includes first means for mixing said control carrier signal from said first subscriber station with information signals from said first and second subscriber stations, and second means for mixing said control carrier signal from said second subscriber station with information signals from said first and second subscriber stations so that properly spatially phased information signal components are created for transmission to the correct subscriber station so that information can be transmitted between said first and second subscriber stations.

7. A retrodirective node for use in a communications system according to claim 6, wherein said third means further includes a first filter means coupled to an output of said first mixing means, said first filter means arranged to produce an output signal consisting of only said information signal and said control carrier signal from said first subscriber station and a second filter means coupled to an output of said second mixing means, said second filter means arranged to produce an output signal consisting of only said information signal and said control carrier signal from said second subscriber station.

8. A retrodirective node for use in a communications system according to claim 7, wherein there is further included means for mixing an output signal from said first filter means with said control carrier signal from said second subscriber station and means for mixing an output signal from said second filter means with said control carrier signal from said first subscriber station.

9. A communication system having at least two retrodirective node stations, at least one subscriber station associated with each retrodirective node station and a communications link between said at least two retrodirective node stations, said communication systems comprising means for establishing a first retrodirective oscillating loop between one of said subscriber stations and its associated retrodirective node station and for establishing a second retrodirective oscillating loop between the other of said subscriber stations and its associated node stations, said first and second retrodirective oscillating loops being interdependent and being established substantially simultaneously via said communications link which conveys energy characteristic of a first retrodirective oscillating loop to said second retrodirective node and which conveys energy characteristic of said second retrodirective oscillating loop to said first retrodirective node so that the energy characteristic of each of said retrodirective oscillating loops combine in each of said retrodirective nodes and means for transferring information between said subscriber stations via said first and second retrodirective oscillating loops and said communications link.

10. A communications system according to claim 9, wherein said communications link includes a satellite.

11. A retrodirective node station for use in a communications system having at least two subscriber stations, said retrodirective node station comprising a retrodirective array transceiver including receiving and transmitting antenna arrays, each antenna array having individual antenna elements, means coupling said receiver antenna elements to said transmitting antenna elements including filter means having a pass band selected to pass a reference carrier signal provided by each subscriber station, said reference carrier signals being of complementary frequencies, and means for receiving signals passed by the filter means to produce therefrom characteristic signals for transmission to each subscriber station thereby establishing substantially simultaneously interdependent retrodirective oscillating loops between subscriber stations and said retrodirective node station to permit communications between the subscriber stations.

12. The retrodirective node station of claim 11, wherein the characteristics signals transmitted to each subscriber station have the same frequency and spatial phases dependent upon the receiving subscriber station.

13. The retrodirective node station of claim 11, wherein the characteristic signals transmitted to each subscriber station have unequal and related frequencies and spatial phases dependent upon the receiving station.

14. A communication system having at least two retrodirective node stations and a communications link between said node stations and at least one subscriber station associated with each retrodirective node station, each of said retrodirective node stations comprising a retrodirective array transceiver including receiving and transmitting antenna arrays, each antenna array having individual antenna elements, means coupling said receiver antenna elements to said transmitting antenna elements including filter means having a pass band selected to pass reference carrier signals of complementary frequency provided by each subscriber station, mixer means for receiving signals passed by the filter means and producing therefrom signals of a characteristic frequency, means for combining the signals of characteristic frequency with the reference carrier signals to produce control carrier signals for transmission to each subscriber station for establishing substantially simultaneously first and second interdependent retrodirective oscillating loops between the subscriber stations and the respective retrodirective node stations, said first and second interdependent retrodirective oscillating loops being established via said communications link which conveys energy characteristic of said second retrodirective oscillating loop to said first retrodirective node and which conveys energy characteristics of said first retrodirective oscillating loop to said second retrodirective oscillating node so that energy characteristics of each of said retrodirective oscillating loops combine in each of said retrodirective nodes and means for transferring information between said subscriber stations via said first and second retrodirective oscillating loops and said communications link.

15. A communications system according to claim 14, wherein said mixer multiplies the signals to produce a signal having a characteristic frequency equal to the sum of the complementary frequencies.

16. A communications system according to claim 15, wherein said means for producing control carrier signals includes a filter coupled to an output of said mixer, said filter having a pass band capable of passing the output signal from the mixer, a reference oscillator for producing a reference oscillator signal having a frequency related to the frequency of the reference carrier signals and means for mixing an output signal of said filter with said reference oscillator signal.

* * * * *